US006724159B2

(12) United States Patent
Gutta et al.

(10) Patent No.: US 6,724,159 B2
(45) Date of Patent: Apr. 20, 2004

(54) METHOD AND APPARATUS FOR CONTROLLING LIGHTING BASED ON USER BEHAVIOR

(75) Inventors: Srinivas Gutta, Yorktown Heights, NY (US); Antonio J. Colmenarez, Maracaibo (VE); Miroslav Trajkovic, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/029,831

(22) Filed: Dec. 27, 2001

(65) Prior Publication Data

US 2003/0122507 A1 Jul. 3, 2003

(51) Int. Cl.$^7$ ................................................. G05F 1/00
(52) U.S. Cl. ........................................ 315/292; 382/100
(58) Field of Search ................................ 315/291, 292, 315/293, 312, 360; 362/223; 381/56, 61; 382/100; 380/234; 709/217

(56) References Cited

U.S. PATENT DOCUMENTS

| | | | |
|---|---|---|---|
| 4,000,400 A | | 12/1976 | Elder ........................... 235/92 |
| 5,386,210 A | | 1/1995 | Lee .............................. 340/567 |
| 5,394,259 A | * | 2/1995 | Takahara ..................... 359/142 |
| 5,406,176 A | * | 4/1995 | Sugden ........................ 315/292 |
| 5,548,188 A | | 8/1996 | Lee .............................. 315/156 |
| 5,803,589 A | | 9/1998 | Lee .............................. 362/225 |
| 6,144,162 A | * | 11/2000 | Smith ....................... 315/169.1 |
| 6,175,632 B1 | * | 1/2001 | Marx ............................ 381/56 |
| 6,650,761 B1 | * | 11/2003 | Rodriguez et al. .......... 382/100 |

FOREIGN PATENT DOCUMENTS

| | | | |
|---|---|---|---|
| EP | 0447136 A2 | 8/1991 | |
| JP | 08060956 | 5/1996 | |
| WO | WO9305627 | 3/1993 | ........... H05B/37/02 |

\* cited by examiner

*Primary Examiner*—Wilson Lee
*Assistant Examiner*—Jimmy T. Vu
(74) *Attorney, Agent, or Firm*—Gregory L. Thorne

(57) ABSTRACT

A lighting controller is disclosed that automatically adjusts a lighting device based on user activity. The disclosed lighting controller processes at least one of audio and video information to identify predefined user events that suggest that a lighting device should be activated or adjusted. In one implementation, a number of behavior rules define various user activities or events that suggest that the user would like to activate or adjust a lighting device. Each rule contains one or more conditions, and, optionally, a corresponding action-item that should be performed when the rule is satisfied to activate or adjust the lighting device. Upon detection of a predefined event, the corresponding action, if any, is performed by the lighting controller.

16 Claims, 3 Drawing Sheets

USER PROFILE(S) -- 200

| | USER ID 250 | RULE CRITERIA 260 | ACTION 270 |
|---|---|---|---|
| 205 | JOHN SMITH | BRING IN MAIL AND SIT IN EASY CHAIR | TURN ON LIGHT FOCUSED ON EASY CHAIR WITH AN INTENSITY APPROPRIATE FOR READING |
| 206 | JANE SMITH | READING NEWSPAPER ON COUCH | TURN ON LIGHT FOCUSED ON COUCH UNTIL SNORING IS DETECTED, THEN TURN OFF LIGHT |
| 207 | ... | | |
| 208 | DEFAULT (ALL USERS) | SIT IN EASY CHAIR WITH FEET UP | TURN ON LIGHT FOCUSED ON EASY CHAIR WITH AVERAGE INTENSITY |

FIG. 2

METHOD AND APPARATUS FOR CONTROLLING LIGHTING BASED ON USER BEHAVIOR

FIELD OF THE INVENTION

The present invention relates to methods and apparatus for controlling lighting devices, and more particularly, to a method and apparatus for automatically controlling lighting devices based on user activity.

BACKGROUND OF THE INVENTION

The consumer marketplace offers a number of lighting devices and lighting controllers that include features intended to increase the convenience and capabilities of these devices. Many available lighting devices, for example, have an associated remote control device that allows the user to adjust a number of the light settings remotely. For example, a user can typically activate a light or adjust the intensity, direction or other settings of the light using the remote control. The Clapper™ lighting controller, for example, controls lights or other appliances by detecting the sound of clapping hands. In one variation, the Clapper™ lighting controller can control multiple lights or appliances, with each device assigned a unique number of claps to control the device.

While such remote controls have greatly improved the convenience of lighting devices, they still require the affirmative action of the user to manipulate the remote control (or another input mechanism associated with the device) to turn on the light or to indicate the manner in which the light should be adjusted. Thus, if the remote control is not readily available, or the user does not wish to move closer to the device itself, the user may still be unable to conveniently activate the lighting device or adjust one or more light settings in a desired manner.

It has been observed that there is often a predictable relationship between certain user activity and a corresponding manner in which the settings of a light should be adjusted. For example, it may be observed that when a particular user sits in a particular chair at a certain time of day, the user also tends to turn on a certain light using the remote control. There is currently no mechanism, however, that learns such ritualistic user activity and automatically activates or adjusts a lighting device.

A need therefore exists for a lighting controller that monitors user activity and automatically activates or adjusts a light in response to predefined events or behavior. A further need exists for a lighting controller that employs a rule-base to define user activities or events, as well as the corresponding responses that should be implemented to activate or adjust the lighting device.

SUMMARY OF THE INVENTION

Generally, a method and apparatus are disclosed for automatically controlling a lighting device based on user activity. The disclosed lighting controller processes at least one of audio and video information to identify predefined user events that suggest that a lighting device should be activated or adjusted.

According to an exemplary rule-based implementation of the invention, a number of behavior rules can define various user activities or events that suggest that the user would like to activate or adjust a lighting device. Each rule contains one or more conditions, and, optionally, a corresponding action-item that should be performed when the rule is satisfied to activate or adjust the lighting device. Upon detection of a predefined event, the corresponding action, if any, is performed by the lighting controller.

A more complete understanding of the present invention, as well as further features and advantages of the present invention, will be obtained by reference to the following detailed description and drawings.

BRIEF DESCRIPTION OF THE DRAWINGS

FIG. 2 illustrates a sample table from the user profile of FIG. 1 in accordance with the present invention.

DETAILED DESCRIPTION

Figure 1:
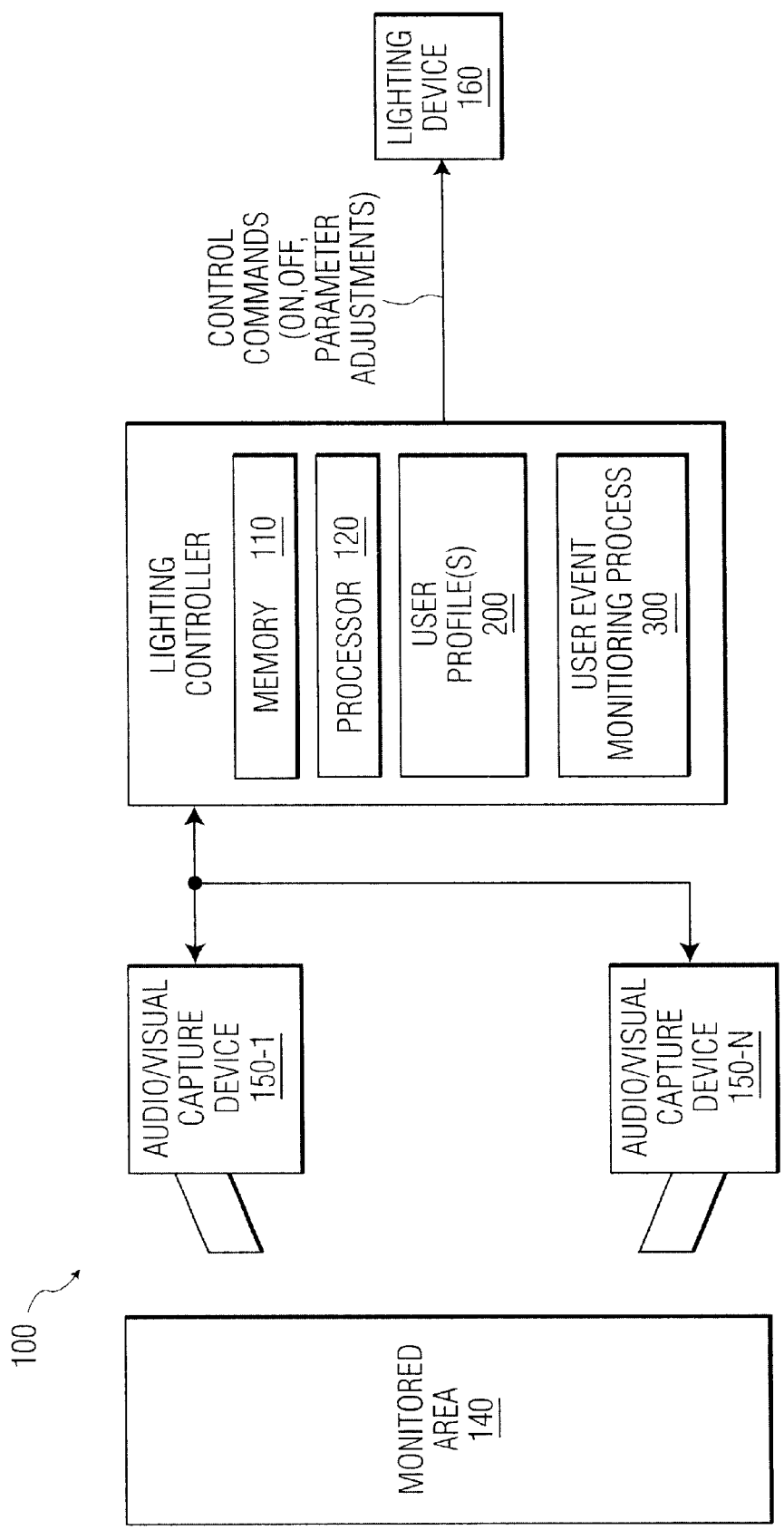
FIG. 1 illustrates a lighting controller in accordance with the present invention.

FIG. 1 illustrates a lighting controller 100 in accordance with the present invention. As shown in FIG. 1, the lighting controller 100 includes one or more audio/visual capture devices 150-1 through 150-N (hereinafter, collectively referred to as audio/visual capture devices 150) that are focused on one or more monitored areas 140.

Each audio/visual capture device 150 may be embodied, for example, as a fixed or pan-tilt-zoom (PTZ) camera for capturing image or video information, or one or more microphones for capturing audio information (or both). The audio and video information generated by the audio/visual capture devices 150 are processed by the lighting controller 100, in a manner discussed below in conjunction with FIG. 3, to identify one or more predefined user activities or events suggesting that the user would like to activate or adjust one or more lighting device(s) 160. In a rule-based implementation, the present invention employs a user profile 200, discussed further below in conjunction with FIG. 2, that records a number of behavior rules identifying user behavior that should initiate the activation or adjustment of a light 160 in a specified manner.

The user behavior defined in the profile 200 may be detected by the lighting controller 100 in accordance with the present invention. As discussed further below, each exemplary behavior rule contains one or more criteria that must be satisfied in order for the rule to be triggered, and, optionally, a corresponding action-item that should be performed by the lighting controller 100 to activate or adjust a light 160 when the predefined criteria for initiating the behavior rule is satisfied.

At least one of the criteria for each rule is a condition detected in the audio or video information generated by the audio/visual capture devices 150 using audio or vision-based techniques, in accordance with the present invention. Upon detection of such predefined user behavior, the corresponding action, if any, is performed by the lighting controller 100. Typically, the corresponding action is the issuance of a command to adjust or activate (turn on or off) the light 160.

As shown in FIG. 1, and discussed further below in conjunction with FIG. 3, the lighting controller 100 also contains a user event monitoring process 300. Generally, the user event monitoring process 300 processes the audio information or images obtained by the audio/visual capture devices 150 and detects one or more predefined behavior actions that should trigger the activation or adjustment of a light 160.

The lighting controller 100 may be embodied as any computing device, such as a personal computer or workstation, that contains a processor 120, such as a central processing unit (CPU), and memory 110, such as RAM and/or ROM. Alternatively, the lighting controller 100 may be embodied as an application specific integrated circuit (ASIC) (not shown) that is included, for example, in a television, set-top terminal or another electronic device.

FIG. 2 illustrates an exemplary table of the user profile(s) 200 that records various behavioral rules for one or more users. Each rule in the user profile(s) 200 identifies the corresponding user(s) and includes predefined criteria specifying the conditions under which the rule should be initiated, and, optionally, a corresponding action item that should be triggered when the criteria associated with the rule is satisfied. Typically, the action item identifies the light(s) 160 that should be activated or adjusted when the rule is triggered.

As shown in FIG. 2, the user profile 200 is comprised of a plurality of records, such as records 205–208, each associated with a different behavioral rule. For each rule, the user profile 200 identifies the corresponding user(s) in field 250, the corresponding rule criteria for a given behavioral event in field 260 and the corresponding action, if any, in field 270.

For example, the user habits recorded in record 205 for the user, John Smith, indicates that the user generally turns on the light after checking the mail and sitting in a certain chair. Likewise, the user habits recorded in record 206 for the user, Jane Smith, indicates that the user likes to read the newspaper while on the couch. Finally, the exemplary user habits recorded in record 208 for all users indicates that most users would like to have a light on when they sit in a certain seat with their feet up. The corresponding action item associated with each rule typically activates a light with an appropriate intensity and/or direction (variable intensity and position) or otherwise adjusts the intensity, direction or other settings of a lighting device.

Generally, the user behavior recorded in the user profile(s) 200 can be obtained explicitly, i.e., from survey responses, or implicitly, by monitoring how a given user responds to a given set of circumstances. Thereafter, a rule can be established that defines the given set of circumstances and the corresponding action item that should be performed.

Figure 3:
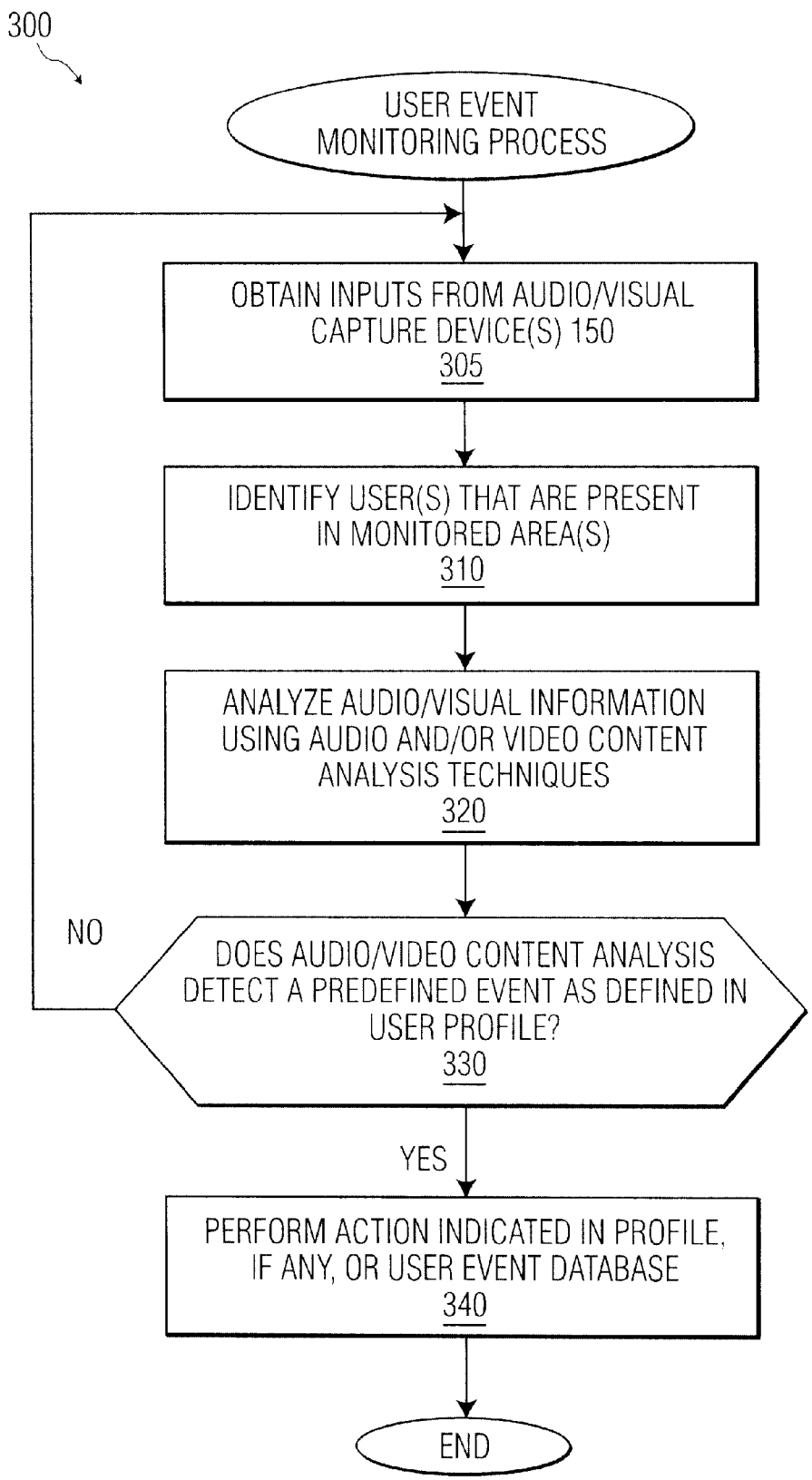
FIG. 3 is a flow chart describing an exemplary user event monitoring process embodying principles of the present invention.

FIG. 3 is a flow chart describing an exemplary user event monitoring process 300. The user event monitoring process 300 processes audio or video information (or both) obtained from the audio/visual capture devices 150 and detects one or more user events defined in the user profile 200. The exemplary user event monitoring process 300 is a general process illustrating the broad concepts of the present invention. As shown in FIG. 3, the user event monitoring process 300 initially obtains one or more inputs from the audio/visual capture devices 150 during step 305. Thereafter, the user event monitoring process 300 optionally identifies the user(s) that are present during step 310, for example, using a biometric evaluation of the audio or visual information obtained from the audio/visual capture device 150.

Thereafter, the audio/visual information is analyzed during step 320 using audio and/or video content analysis (VCA) techniques. For a detailed discussion of suitable audio content analysis techniques, see, for example, Silvia Pfeiffer et al., "Automatic Audio Content Analysis," Proc. ACM Multimedia 96, 21–30, Boston, Mass. (November 1996), incorporated by reference herein. For a detailed discussion of suitable VCA techniques, see, for example, Nathanael Rota and Monique Thonnat, "Video Sequence Interpretation for Visual Surveillance," in Proc. of the 3d IEEE Int'l Workshop on Visual Surveillance, 59–67, Dublin, Ireland (Jul. 1, 2000), and Jonathan Owens and Andrew Hunter, "Application of the Self-Organizing Map to Trajectory Classification,' in Proc. of the 3d IEEE Int'l Workshop on Visual Surveillance, 77–83, Dublin, Ireland (Jul. 1, 2000), incorporated by reference herein. Generally, the audio content analysis and VCA techniques are employed to recognize various features in the signals obtained by the audio/visual capture devices 150.

A test is performed during step 330 to determine if the audio/video content analysis detects a predefined event, as defined in the user profile 300. If it is determined during step 330 that the audio/video content analysis does not detect a predefined event, then program control returns to step 310 to continue monitoring user activities in the manner discussed above.

If, however, it is determined during step 330 that the audio/video content analysis detects a predefined user event, then the event is processed during step 340 as indicated in field 270 of the user profile 200, if any, for the identified user. Program control then terminates (or returns to step 310 and continues monitoring user activities in the manner discussed above).

It is to be understood that the embodiments and variations shown and described herein are merely illustrative of the principles of this invention and that various modifications may be implemented by those skilled in the art without departing from the scope and spirit of the invention.

What is claimed is:

1. A method for controlling an area lighting device, comprising:
    analyzing at least one of audio and video information focused on a monitored area to identify at least one predefined user activity; and
    adjusting said area lighting device when said user activity is identified, wherein said user activity is one of a predefined gestural command and a ritualistic behavior that triggers the issuance of a corresponding command to control said area lighting device.

2. The method of claim 1, wherein said user activity suggests that said user would like to activate said area lighting device.

3. The method of claim 1, wherein said user activity suggests that said user would like to adjust said area lighting device.

4. The method of claim 3, wherein said adjustment to said area lighting device is an adjustment to a lighting intensity.

5. The method of claim 3, wherein said adjustment to said area lighting device is an adjustment to a lighting direction.

6. A method for controlling an area lighting device, comprising:
    establishing at least one rule defining a predefined user activity, said rule including at least one condition and an action item to be performed to automatically adjust said area lighting device when said rule is satisfied;
    analyzing at least one of audio and video information focused on a monitored area to identify said condition; and
    performing said action item if said rule is satisfied, wherein said user activity is one of a predefined gestural command and a ritualistic behavior and said action item is the issuance of a corresponding command to control said area lighting device in a desired manner.

7. The method of claim 6, wherein said user activity suggests that said user would like to activate said area lighting device.

8. The method of claim 6, wherein said user activity suggests that said user would like to adjust said area lighting device.

9. The method of claim 6, wherein said rule includes one or more settings for said area lighting device that should be established when said rule is satisfied.

10. A system for controlling an area lighting device, comprising:

a memory for storing computer readable code; and a processor operatively coupled to said memory, said processor configured to:

analyze at least one of audio and video information focused on a monitored area to identify at least one predefined user activity; and adjust said area lighting device when said user activity is identified, wherein said user activity is one of a ritualistic behavior and a predefined gestural command that triggers the issuance of a corresponding command to control said area lighting device in a desired manner.

11. The system of claim 10, wherein said user activity suggests that said user would like to activate said area lighting device.

12. The system of claim 10, wherein said user activity suggests that said user would like to adjust said area lighting device.

13. The system of claim 10, wherein said processor is further configured to process at least one rule defining a predefined user activity, said rule including at least one condition and an action item to be performed to automatically activate said area lighting device when said rule is satisfied.

14. The system of claim 13, wherein said rule includes one or more settings for said area lighting device that should be established when said rule is satisfied.

15. An article of manufacture for controlling an area lighting device, comprising:

a computer readable medium having computer readable code means embodied thereon, said computer readable program code means comprising:

a step to analyze at least one of audio and video information focused on a monitored area to identify at least one predefined user activity, wherein said user activity is one of a ritualistic behavior and a predefined gestural command; and a step to adjust said area lighting device when said user activity is identified.

16. A system for controlling an area lighting device, comprising:

means for analyzing at least one of audio and video information focused on a monitored area to identify at least one predefined user activity, wherein said user activity is one of a ritualistic behavior and a predefined gestural command; and means for adjusting said area lighting device when said user activity is identified.

* * * * *